United States Patent
Sasagawa et al.

(10) Patent No.: US 7,018,144 B2
(45) Date of Patent: Mar. 28, 2006

(54) DRILL

(75) Inventors: Yasushi Sasagawa, Tsukuba (JP); Koji Masamoto, Yuki-Gun (JP); Junichi Saito, Tsukuba (JP); Kenichi Yajima, Shimozuma (JP); Takeshi Sato, Iwai (JP)

(73) Assignee: Mitsubishi Materials Corporation, Tokyo (JP)

( * ) Notice: Subject to any disclaimer, the term of this patent is extended or adjusted under 35 U.S.C. 154(b) by 220 days.

(21) Appl. No.: 10/745,375

(22) Filed: Dec. 22, 2003

(65) Prior Publication Data

US 2004/0136798 A1 Jul. 15, 2004

(30) Foreign Application Priority Data

| Jul. 2, 2002 | (JP) | ................................. | 2002-193467 |
| Jul. 2, 2002 | (JP) | ................................. | 2002-193468 |
| Jan. 15, 2003 | (JP) | ................................. | 2003-007063 |

(51) Int. Cl.
    *B23B 51/00* (2006.01)

(52) U.S. Cl. ........................... 408/230; 408/227
(58) Field of Classification Search ............ 408/227, 408/230, 229, 704, 705
    See application file for complete search history.

(56) References Cited

U.S. PATENT DOCUMENTS

| 3,400,617 | A | * | 9/1968 | Sanborn ................... 408/223 |
| 3,778,180 | A | * | 12/1973 | Ostrom ..................... 408/226 |
| 3,947,143 | A | * | 3/1976 | Gulla ....................... 408/230 |
| 4,231,692 | A | * | 11/1980 | Brabetz et al. ............ 408/230 |
| 4,759,667 | A | * | 7/1988 | Brown ...................... 408/230 |
| 5,380,133 | A | * | 1/1995 | Schimmer ................. 408/199 |
| 5,384,617 | A | | 1/1995 | Houer et al. |
| 5,895,179 | A | | 4/1999 | Fritz et al. |
| 2004/0037662 | A1 | * | 2/2004 | Kaneko et al. ............ 408/230 |

FOREIGN PATENT DOCUMENTS

| DE | 19843517 A1 | * | 3/2000 |
| EP | 0 608 084 A1 | | 7/1994 |
| EP | 1 340 572 A1 | | 9/2003 |
| FR | 507 822 A | | 9/1920 |
| GB | 261 651 A | | 11/1926 |
| JP | 01316108 A | * | 12/1989 |
| JP | 7-33514 A1 | | 6/1995 |
| JP | 2001277189 A | * | 10/2001 |
| WO | WO 02/40206 A | | 5/2002 |

* cited by examiner

*Primary Examiner*—Derris H. Banks
*Assistant Examiner*—J Williams
(74) *Attorney, Agent, or Firm*—Darby & Darby

(57) ABSTRACT

The drill of the present invention has only one cutting discharge groove (11) formed in the outer periphery of a bit (10). A leading edge protruding farthest towards the tip in the axial direction in a tip flank (12) is composed at a single point and located on an axis (O). When bit is viewed from the tip side in the direction of axis, tip flank is in the form of a multilevel surface composed of second through fourth flanks (14B, 14C and 14D) arranged along the peripheral direction, and a reverse side first flank (14E) surrounded by second through fourth flanks and intersecting with axis.

15 Claims, 13 Drawing Sheets

FIG. 12

EXPERIMENTAL EXAMPLE

| | | |
|---|---|---|
| START ∫ 500 HITS | MEAN+3σ[19]μm<br>MAXIMUM HOLE POSITION DEVIATION[29]μm<br>AVERAGE HOLE POSITION DEVIATION[8]μm<br>STANDARD DEVIATION(σ)[4] | 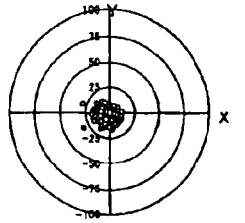 |
| 501 ∫ 1000 HITS | MEAN+3σ[19]μm<br>MAXIMUM HOLE POSITION DEVIATION[21]μm<br>AVERAGE HOLE POSITION DEVIATION[8]μm<br>STANDARD DEVIATION(σ)[4] | 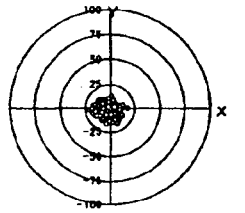 |
| 1001 ∫ 1500 HITS | MEAN+3σ[23]μm<br>MAXIMUM HOLE POSITION DEVIATION[42]μm<br>AVERAGE HOLE POSITION DEVIATION[9]μm<br>STANDARD DEVIATION(σ)[5] | 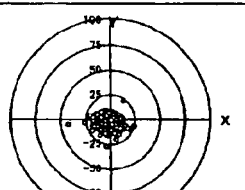 |
| 1501 ∫ 2000 HITS | MEAN+3σ[23]μm<br>MAXIMUM HOLE POSITION DEVIATION[36]μm<br>AVERAGE HOLE POSITION DEVIATION[9]μm<br>STANDARD DEVIATION(σ)[5] | 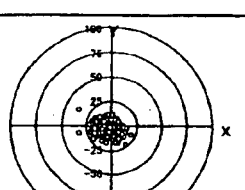 |
| 2001 ∫ 2500 HITS | MEAN+3σ[23]μm<br>MAXIMUM HOLE POSITION DEVIATION[26]μm<br>AVERAGE HOLE POSITION DEVIATION[9]μm<br>STANDARD DEVIATION(σ)[5] | 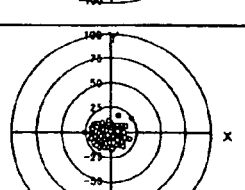 |
| 2501 ∫ 3000 HITS | MEAN+3σ[24]μm<br>MAXIMUM HOLE POSITION DEVIATION[36]μm<br>AVERAGE HOLE POSITION DEVIATION[10]μm<br>STANDARD DEVIATION(σ)[5] | 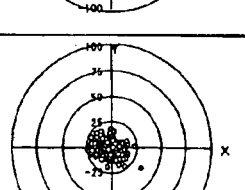 |

FIG. 13

EXAMPLE OF PRIOR ART

| START<br>≦<br>500<br>HITS | MEAN+3σ[67]μm<br>MAXIMUM HOLE POSITION DEVIATION[72]μm<br>AVERAGE HOLE POSITION DEVIATION[35]μm<br>STANDARD DEVIATION(σ)[11] | |
|---|---|---|
| 501<br>≦<br>1000<br>HITS | MEAN+3σ[65]μm<br>MAXIMUM HOLE POSITION DEVIATION[66]μm<br>AVERAGE HOLE POSITION DEVIATION[34]μm<br>STANDARD DEVIATION(σ)[10] | |
| 1001<br>≦<br>1500<br>HITS | MEAN+3σ[68]μm<br>MAXIMUM HOLE POSITION DEVIATION[67]μm<br>AVERAGE HOLE POSITION DEVIATION[35]μm<br>STANDARD DEVIATION(σ)[11] | |
| 1501<br>≦<br>2000<br>HITS | MEAN+3σ[70]μm<br>MAXIMUM HOLE POSITION DEVIATION[72]μm<br>AVERAGE HOLE POSITION DEVIATION[34]μm<br>STANDARD DEVIATION(σ)[12] | |
| 2001<br>≦<br>2500<br>HITS | MEAN+3σ[71]μm<br>MAXIMUM HOLE POSITION DEVIATION[70]μm<br>AVERAGE HOLE POSITION DEVIATION[35]μm<br>STANDARD DEVIATION(σ)[12] | |
| 2501<br>≦<br>3000<br>HITS | MEAN+3σ[71]μm<br>MAXIMUM HOLE POSITION DEVIATION[72]μm<br>AVERAGE HOLE POSITION DEVIATION[34]μm<br>STANDARD DEVIATION(σ)[13] | |

DRILL

BACKGROUND OF THE INVENTION

1. Field of the Invention

The present invention relates to a drill used for drilling holes in a drilled material. More particularly, the present invention also relates to a small drill used for drilling small-diameter, deep holes in drilled materials such as printed circuit boards, minute metal parts and plastics.

2. Description of Related Art

In the case of small drills, the holes to be drilled typically have an extremely small diameter. A bit in the form of a small-diameter rod having a diameter of about 0.01–3.175 mm is provided on the tip section of a drill body that is rotated around an axis. A comparatively large-diameter shank section for clamping the drill body to a rotary shaft of a machine tool is provided either integrally, or brazed or fastened and so forth on the rear end of the drill body. Cemented carbide is normally used for the material of the bit, while cemented carbide, steel or other steel material is used for the shank section.

A commonly used example of such a small drill of the prior art is a two flute drill in which two cutting discharge grooves are formed in the bit, and two cutting edges are respectively formed in the intersecting ridgeline between the wall surface facing towards the front side in the direction of drill rotation of these cutting discharge grooves and the tip flank of the bit. However, in the case of two-flute small drills, the core thickness is required to be thin and the rigidity of the drill body becomes small, thereby resulting in the problem of increased susceptibility to breakage of the bit and particularly decreased positional accuracy of the hole caused by curvature of the hole.

In contrast, an example of a small drill enable to ensure large rigidity of the drill body is disclosed in Japanese Unexamined Utility Model Application, First Publication No. 7-33514 (FIGS. 1 through 3). This type of small drill is a single flute drill in which, together with one cutting discharge groove being formed in the bit, one cutting edge is formed in the intersecting ridgeline between the wall surface facing towards the front side in the direction of drill rotation of the cutting discharge groove and the tip flank of the bit.

A chisel edge, which has a roughly linear shape extending in the direction that intersects with the axis, is formed in the vicinity of the axis in the tip flank of the bit. This roughly linear chisel edge serves as the leading edge that protrudes farthest towards the tip in the axial direction in the tip flank. The tip flank is composed of a flat first flank and second flank, and a third flank, which together with having a conical shape, accounts for more than half of the tip flank, sequentially arranged along the peripheral direction from the cutting edge towards the rear side in the direction of drill rotation. An adequate recess is imparted to these first through third flanks so that there is no contact with the drilled material during drilling of the drilled material.

However, in the case of a single flute small drill as described above, the chisel edge extending in a direction perpendicular to the axis cuts into the drilled material in the form of linear contact during drilling of a drilled material, or cuts into the drilled material from one end of the chisel edge (away from the axis). In addition, in the case of a single flute small drill as described above, since there is only one cutting edge that acts to contact and cut into the drilled material during drilling of a drilled material, it is difficult to maintain the drill body in a stable state. Consequently, runout of the drill body occurs easily, thereby preventing the obtaining of high linearity. As a result, even in the case of a single flute drill capable of ensuring a high degree of rigidity of the drill body as described above, there is still the problem of being unable to obtain satisfactory hole positional accuracy.

At present, the number of layers of layered drilled materials is increasing (resulting in deeper holes) in order to further enhance drilling efficiency, and the diameter of drilled holes is becoming smaller due to higher wiring densities. Consequently, the diameter of drilled holes is becoming smaller, and the drilling of small-diameter, deep holes having a large ratio of hole depth to hole diameter is increasing.

In the case of small-diameter, deep hole drilling such that the diameter of the hole drilled is 1 mm or less and the ratio of hole depth to hole diameter is 5 or more, it becomes difficult to ensure the rigidity of the small drill used. In the case of the aforementioned two flute drills, in which it is inherently difficult to ensure rigidity of the drill body, in addition to naturally inviting a further decrease in hole positional accuracy due to the lack of rigidity, even in the case of the aforementioned single flute drill, the decrease in hole positional accuracy becomes remarkable.

SUMMARY OF THE INVENTION

In consideration of the aforementioned problems, the object of the present invention is to provide a drill capable of maintaining high rigidity of a drill body while also allowing the obtaining of satisfactory hole positional accuracy.

In order to achieve the aforementioned object, the drill of the present invention comprises a cutting discharge groove extending from the tip to the rear end of a bit formed in the outer periphery of the bit serving as the tip of a drill body that is rotated around an axis, and a cutting edge formed in the intersecting ridgeline between a wall surface facing towards the front side in the direction of drill rotation of the cutting discharge groove and a tip flank of the bit; wherein, there is only one cutting discharge groove, the leading edge that protrudes farthest towards the tip in the axial direction in the tip flank is composed at a single point, and the distance between this leading edge and the axis is (5/100)D or less with respect to the maximum outer diameter D of the bit.

In the present invention employing this constitution, since there is only one cutting discharge groove provided in the bit, the core thickness is thicker in comparison with drills provided with two cutting discharge grooves in the bit, thereby making it possible to maintain high rigidity of the drill body. Since the leading edge in the tip flank is composed at a single point, and this leading edge is located in the vicinity of the axis, a drilled material is cut into from a single point in the vicinity of the axis that serves as the leading edge in the tip flank during drilling of a drilled material. Consequently, there is no occurrence of runout of the drill body, the linearity of the drill body can be enhanced, and satisfactory hole positional accuracy can be obtained.

In the present invention, when the aforementioned bit is viewed from the tip side in the aforementioned axial direction, the aforementioned tip flank may be in the form of a multilevel surface composed of a plurality of flanks arranged along the peripheral direction, and a reverse side first flank formed so as to be surrounded by the plurality of flanks arranged along the peripheral direction and intersect with the aforementioned leading edge.

When composed in this manner, even when the tip flank is made to be in the form of a multilevel surface composed of a plurality of flanks arranged along the peripheral direction in order to impart a recess to the tip flank, the processing error when a flank among these plurality of flanks is formed continuous with the outside in the radial direction of the reverse side first flank can be absorbed by among the remaining amount of the reverse side first flank. Consequently, the risk of the single point serving as the leading edge of the tip flank deviating from the vicinity of the axis due to the processing accuracy of this flank can be eliminated.

In the present invention, when the aforementioned bit is viewed from the tip side in the aforementioned axial direction, the distance between the point farthest away from the axis on the aforementioned reverse side first flank and the axis is preferably (1/3)D or less with respect to the maximum diameter D of the aforementioned bit.

In order to achieve the aforementioned object, the drill of the present invention has a cutting discharge groove extending from the tip towards the rear end of the bit formed in the outer periphery of the bit serving as the tip of a drill body that rotates around an axis, and a cutting edge formed in the intersecting ridgeline between a wall surface facing towards the front side in the direction of drill rotation of the cutting discharge groove and a tip flank of the bit; wherein, there is only one cutting discharge groove, and when the bit is viewed from the tip in the axial direction, the tip flank section located in the region on the opposite side of the cutting edge is in the form of a multilevel surface composed of a plurality of flanks arranged along the peripheral direction juxtaposed about a Y axis perpendicular on the axis to an X axis parallel to the cutting edge through the axis, and at least one of the intersecting ridgelines of the plurality of flanks that compose the tip flank section contact a drilled material during; drilling of the drilled material.

In the present invention composed in this manner, since there is only one cutting discharge groove provided in the bit, the core thickness is thicker in comparison with drills provided with two cutting discharge grooves in the bit, thereby making it possible to maintain high rigidity of the drill body. During drilling of a drilled material, not only the one cutting edge, but also the intersecting ridgeline of this cutting edge and the flank in the region on the opposite side juxtaposed about the Y axis make contact with the drilled material. Consequently, the drill body can be maintained in a stable state without causing runout of the drill body, the linearity of the drill body can be enhanced, and satisfactory hole positional accuracy can be obtained.

In the present invention, the difference between the distance in the axial direction between the outer peripheral edge of the intersecting ridgeline that contacts the drilled material and the leading edge of the tip flank, and the distance in the axial direction between the outer peripheral edge of the aforementioned cutting edge and the leading edge of the tip flank is set to be larger than the feeding amount per rotation imparted to the drill body during drilling of the drilled material.

When composed in this manner, a suitable contact state with the drilled material can be imparted to the intersecting ridgeline that contacts the drilled material during drilling. If the difference between the aforementioned distances is smaller than the feeding amount per rotation imparted to the drill body, interference between this intersecting ridgeline and the drilled material ends up becoming excessive.

In the present invention, an auxiliary groove section may be formed, which together with being continuous with the front side in the direction of drill rotation of the aforementioned cutting discharge groove and extending from the tip to the rear end of the aforementioned bit, is also cut upward to the aforementioned cutting discharge groove starting at an intermediate point.

When composed in this manner, in the case of intending to reuse the drill by regrinding the tip flank, the tip flank to be ground only becomes shorter by the amount the auxiliary groove section is formed. For example, when composing a tip flank in the form of a multilevel surface, the number of flanks that compose the tip flank can be reduced, the number of flanks to be ground is reduced, and the bother and time required for regrinding can be reduced. Since the auxiliary groove section is formed in the shape of a groove that extends from the tip towards the rear end of the bit, the tip flank after regrinding can be maintained in the same shape as that before grinding, thereby preventing any changes in drilling performance. Since the auxiliary groove section is cut upward to the cutting discharge groove starting at an intermediate point, there is no decrease in the rigidity of the drill body beyond that which is necessary.

In the present invention, chisel edges located on roughly mutually opposite sides juxtaposed about the axis are formed in the aforementioned tip flank, and this pair of chisel edges may be made to recede at roughly mutually the same change in inclination towards the rear end in the axial direction moving towards the outside in the radial direction.

When composed in this manner, after the leading edge of the tip flank initially makes contact and cuts into the drilled material during drilling, the location of contact with the drilled material extends evenly towards the outside in the radial direction along the chisel edges. Subsequently, roughly the entire length of the cutting edge contacts the drilled material so that the location of contact with the drilling material reaches from the inner peripheral edge to the outer peripheral edge of the cutting edge. Consequently, by guiding the chisel edges, the linearity of the drill body can be further enhanced, and more satisfactory hole positional accuracy can be obtained.

As in small drills used for drilling small diameter holes such that the diameter of the hole drilled into a drilled material is 1 mm or less and the ratio of hole depth to hole diameter is 5 or more, the present invention can be used particularly effectively in cases in which the maximum outer diameter D of the bit is 1 mm or less, and the ratio of the effective length L of the bit to the maximum outer diameter D of the bit (L/D) is 5 or more, making it difficult ensure rigidity of the drill body and increasing susceptibility to a decrease in hole positional accuracy.

BRIEF DESCRIPTION OF THE DRAWINGS

FIG. 12 is a graph showing the results of a hole drilling test in a drilled material carried out using a small drill that is one example of the present invention.

FIG. 13 is a graph showing the results of a hole drilling test in a drilled material carried out using a small drill of the prior art.

DETAILED DESCRIPTION OF THE INVENTION

Although the following provides an explanation of embodiments of the present invention with reference to the attached drawings, an explanation is first provided of a first embodiment of the present invention.

Figure 1:
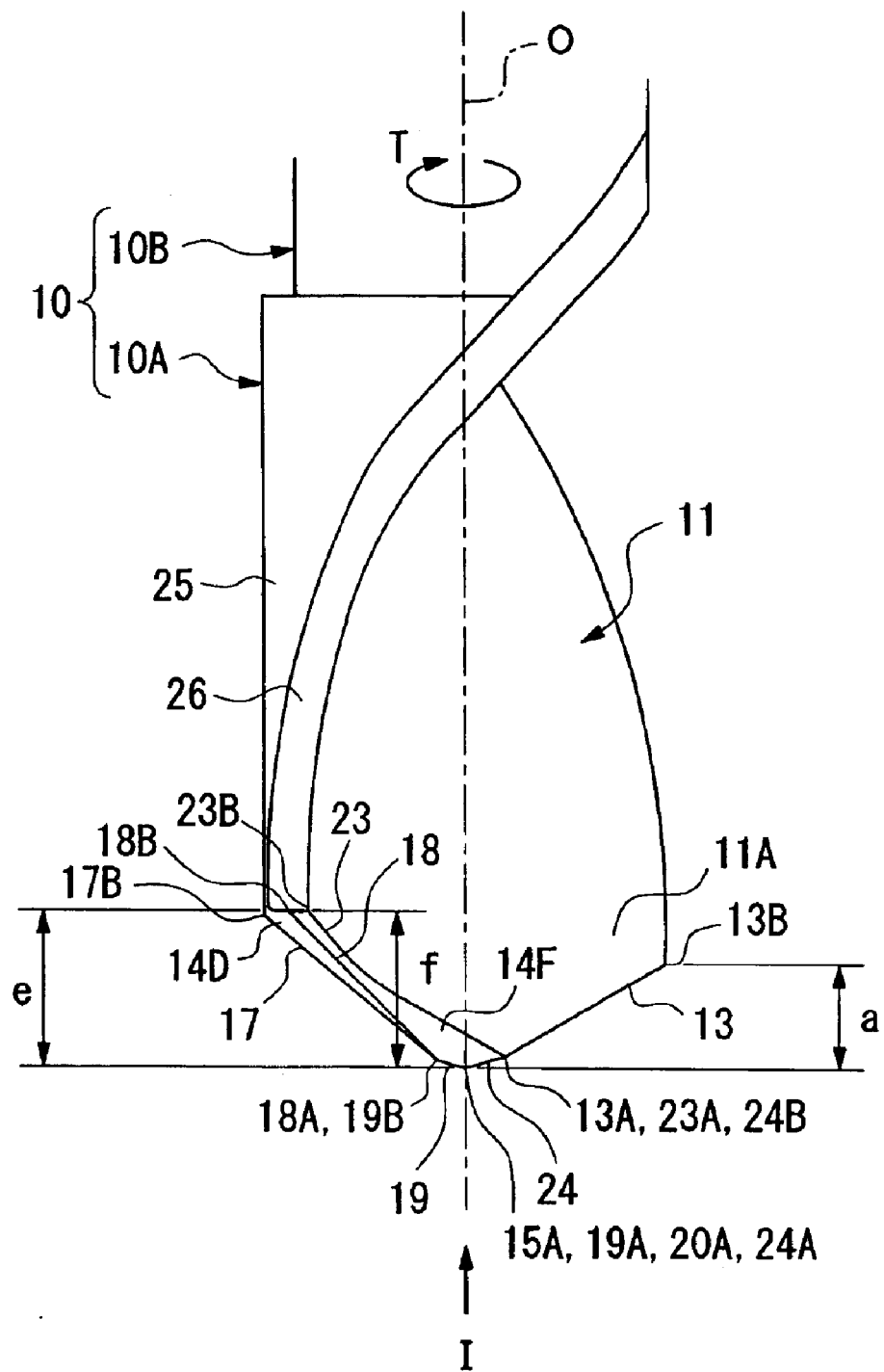
FIG. 1 is an enlarged side view of the essential portion of a bit of a small drill according to a first embodiment of the present invention.
Figure 2:
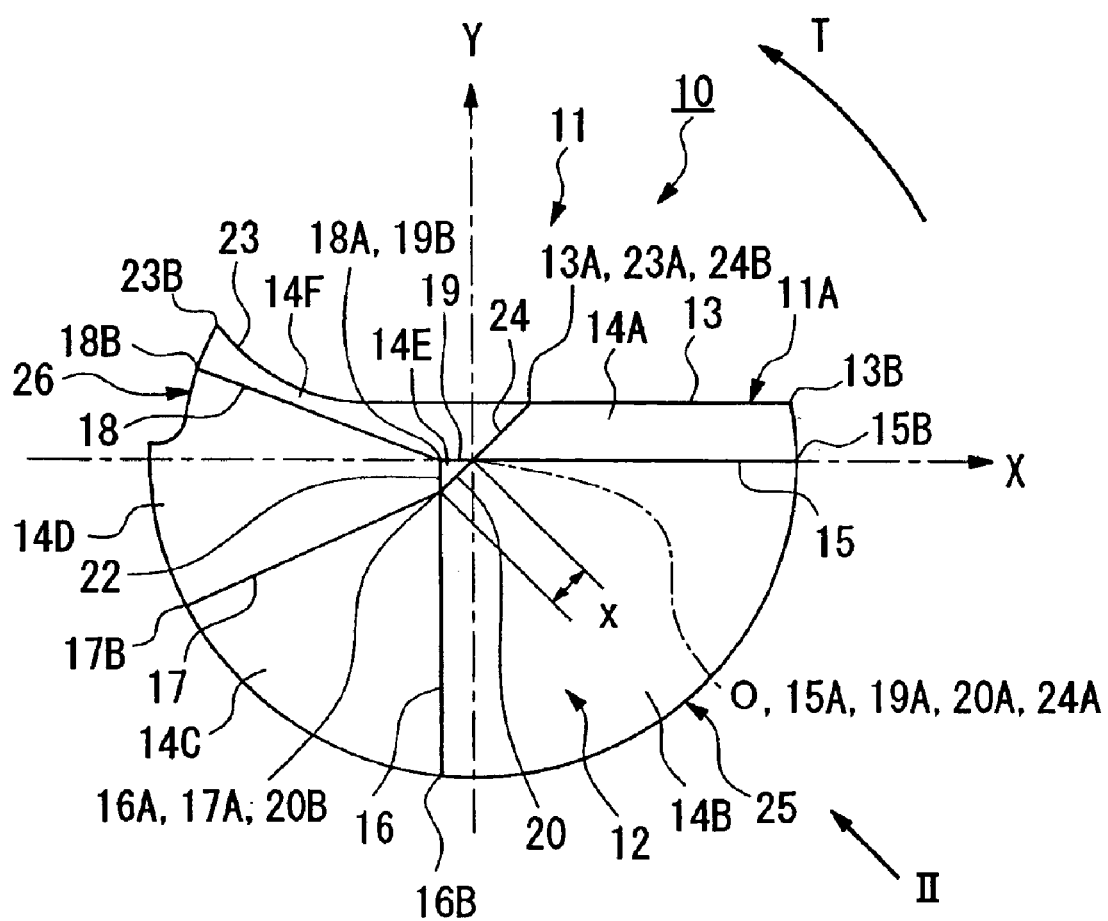
FIG. 2 is a view taken along the direction of arrow I in FIG. 1.
Figure 3:
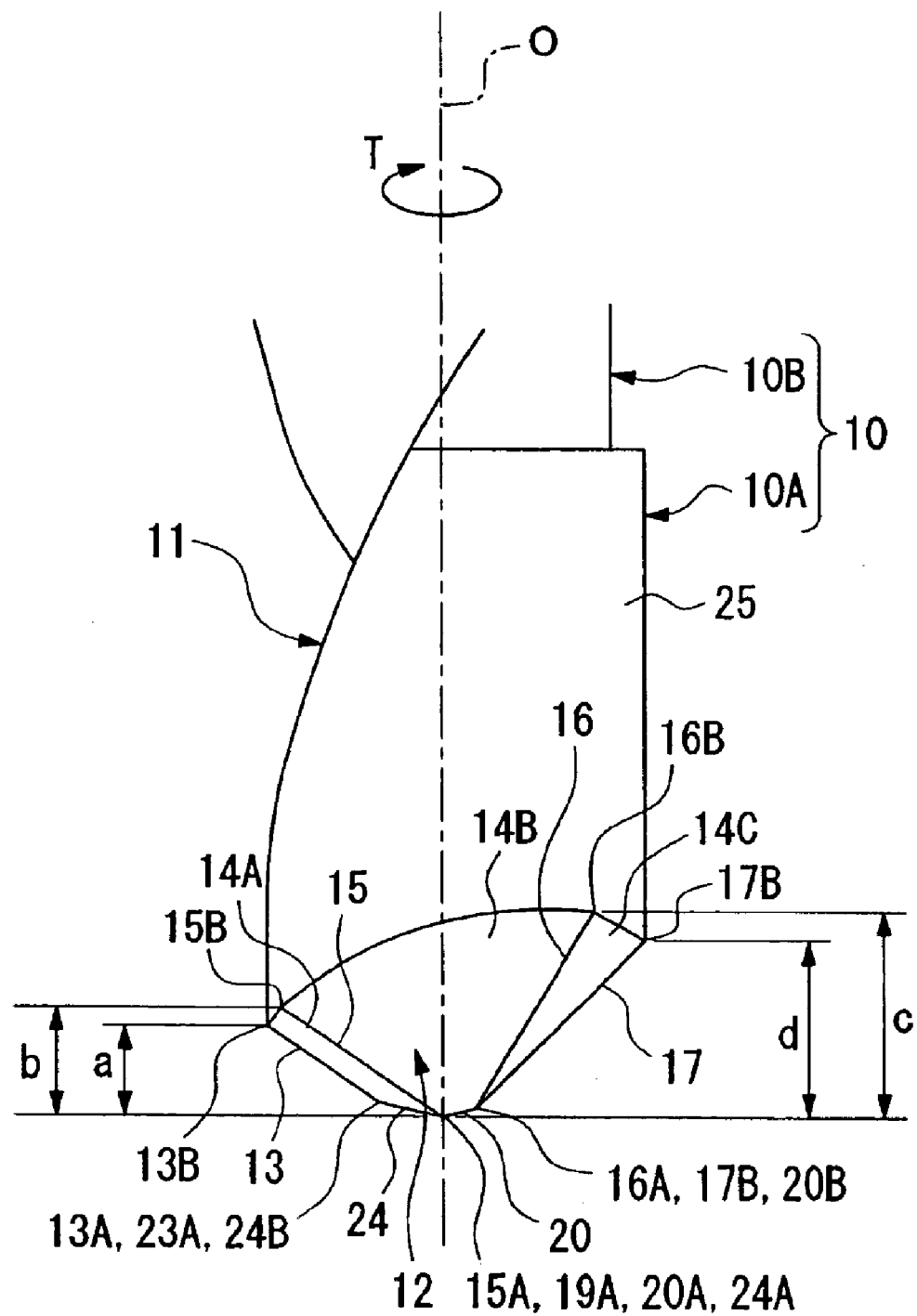
FIG. 3 is a view taken along the direction of arrow II in FIG. 2.
Figure 4:
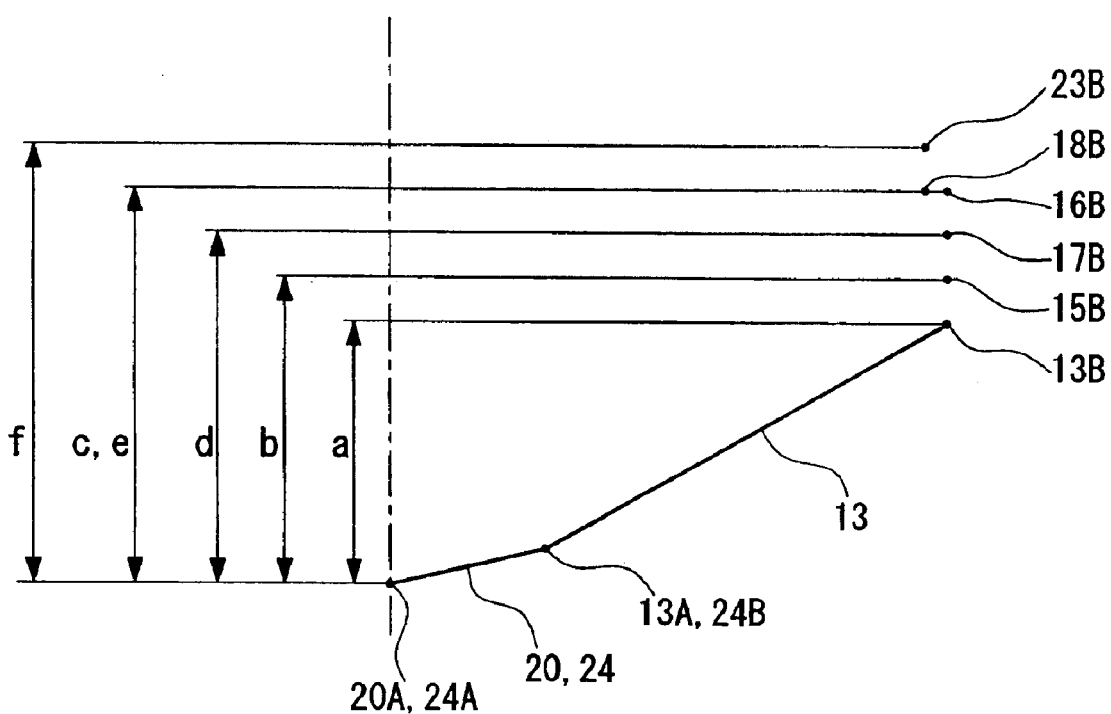
FIG. 4 is a schematic drawing showing the rotation loci of a chisel edge formed in the bit of a small drill according to a first embodiment of the present invention.

FIG. 1 is an enlarged side view of the essential portion of a bit of a small drill according to a first embodiment of the present invention. FIG. 2 is a view taken along the direction of arrow I in FIG. 1. FIG. 3 is a view taken along the direction of arrow II in FIG. 2. FIG. 4 is a schematic drawing showing the rotation loci of a chisel edge and so forth formed in the bit of the small drill according to a first embodiment of the present invention.

Together with the rear end of the drill body of a small drill according to a first embodiment of the present invention being in the form of a shank section clamped in the rotary shaft of a machine tool, the tip end is in the form of a bit 10.

As shown in FIGS. 1 through 3, bit 10 has the shape of a roughly multilevel circular column centered on axis O that rotates around axis O. Bit 10 is composed of a first bit section 10A, which is located on its tip end, and a second bit section 10B, which has an outer diameter one step smaller than outer diameter D of first bit section 10A, and is continuous through a level difference with the rear end side of first bit section 10A. In other words, bit 10 is in the form of a so-called undercut type of bit. The maximum outer diameter D of bit 10 is taken to be the outer diameter D of first bit section 10A (outer diameter of a virtual circle having a margin section 25 to be described later as its arc). The maximum outer diameter D of bit 10 is set to be 1 mm or less.

A tip flank 12 of bit 10 and a single cutting discharge groove 11 that opens to the outside are formed so as not to include axis O by extending from the tip towards the rear end. Cutting discharge groove 11 is twisted into a spiral shape centering on axis O towards the rear side in the direction of drill rotation T moving from the tip to the rear end of bit 10.

The length in the direction of axis O of the section in which cutting discharge groove 11 is formed in bit 10, namely effective length L of bit 10 that can be used for drilling, is set so that the ratio L/D to the maximum outer diameter D of bit 10 (outer diameter D of first bit section 10A) is 5 or more.

The tip region of a wall surface that faces toward the front side in the direction of drill rotation T in cutting discharge groove 11 is in the form of rake face 11A. A cutting edge 13 that extends from the vicinity of axis O towards the outside in the radial direction and has a roughly linear shape that intersects with the outer peripheral surface of bit 10 is formed in the leading edge of rake face 11A, namely the intersecting ridgeline between rake face 11A and the tip flank 12 of bit 10.

An incline is provided in cutting edge 13 having a roughly linear shape so as to face the rear end in the direction of axis O and the rear side in the direction of drill rotation T moving towards the outside in the radial direction. Cutting edge 13 is arranged so that the core rises upward.

In order to provide an explanation of the shape of tip flank 12 of bit 10, virtual X-Y axes are introduced as shown in FIG. 2 for considering bit 10 when viewed from the tip side in the direction of axis O.

Together with the X-Y axes having axis O as their origin by intersecting mutually perpendicularly on axis O, the X axis is arranged in parallel with cutting edge 13. With respect to the X axis, the region in which cutting edge 13 is located juxtaposed about the Y axis (right side in FIG. 2) is taken to be the positive region. With respect to the Y axis, the region in which cutting discharge groove 11 opens juxtaposed about the X axis (top side in FIG. 2) is taken to be the positive region.

As shown in FIG. 2, tip flank 12 is in the form of a multilevel surface composed of a plurality of flat flanks. More specifically, tip flank 12 is composed by arranging flat surfaces in the form of first through fourth flanks 14A, 14B, 14C and 14D sequentially along the peripheral direction and a flat surface in the of reverse side first flank 14E from cutting edge 13 towards the rear side in the direction of drill rotation T, and arranging a flat surface in the form of reverse side second flank 14F on the rear side in the direction of drill rotation T of this reverse side first flank 14E and fourth flank 14D. Tip flank 12 is in the form of a multilevel surface composed of a total of six flat surfaces.

First flank 14A is arranged in the region where both X and Y are positive so that the point closest to axis O on its surface coincides with axis O. Second flank 14B is continuous with the rear side in the direction of drill rotation T of first flank 14A.

Intersecting ridgeline 15 of first flank 14A and second flank 14B is located along the X axis. Together with having axis O as inner peripheral edge 15A, intersecting ridgeline 15 extends roughly linearly from this inner peripheral edge 15A towards the outside in the radial direction, and the point that intersects with the outer peripheral surface of bit 10 is outer peripheral edge 15B.

Cutting edge 13, which serves as the ridgeline on the front side in the direction of drill rotation T of first flank 14A, namely the intersecting ridgeline of first flank 14A and rake face 11A in the form of the tip region of a wall surface facing towards the front side in the direction of drill rotation T in cutting discharge groove 11, is located in parallel with the X axis in the region where both X and Y are positive. Together with the vicinity of axis O serving as inner peripheral edge 13A, cutting edge 13 extends roughly linearly from this inner peripheral edge 13A towards the outside in the radial direction, and the point that intersects with the outer peripheral surface of bit 10 is outer peripheral edge 13B.

Second flank 14B is arranged extending across the region where X is positive and Y is negative and the region where both X and Y are negative so that the point closest to axis O on its surface coincides with axis O. Third flank 14C is continuous with the rear side in the direction of drill rotation T of second flank 14B.

Intersecting ridgeline 16 of second flank 14B and third flank 14C is located in the region where both X and Y are negative. Together with having a location away from axis O by the amount reverse side first flank 14E is formed as inner peripheral edge 16A, intersecting ridgeline 16 extends roughly linearly from this inner peripheral edge 16A while inclining towards the front side in the direction of drill rotation T moving towards the outside in the radial direction, and the point that intersects with the outer peripheral surface of bit 10 is outer peripheral edge 16B.

Third flank 14C is arranged in the region where both X and Y are negative. Fourth flank 14D is continuous with the rear side in the direction of drill rotation T of third flank 14C.

Intersecting ridgeline 17 of third flank 14C and fourth flank 14D is located in the region where both X and Y are negative. Together with having inner peripheral edge 16A of intersecting ridgeline 16 of second flank 14B and third flank 14C as an inner peripheral edge 17A, intersecting ridgeline 17 extends roughly linearly from this inner peripheral edge 17A while inclining towards the rear side in the direction of drill rotation T moving towards the outside in the radial direction, and the point that intersects with the outer peripheral surface of bit 10 is outer peripheral edge 17B.

Fourth flank 14D is arranged extending across the region where both X and Y are negative and the region where X is negative and Y is positive. Reverse side second flank 14F is continuous with the rear side in the direction of drill rotation T of fourth flank 14D.

Intersecting ridgeline 18 of fourth flank 14D and reverse side second flank 14F is located in the region where X is negative and Y is positive. Together with having a location away from axis O by the amount reverse side first flank 14E is formed as inner peripheral edge 18A, intersecting ridgeline 18 extends roughly linearly from this inner peripheral edge 18A while inclining towards the rear side in the direction of drill rotation T moving towards the outside in the radial direction, and the point that intersects with the outer peripheral surface of bit 10 is outer peripheral edge 18B.

Reverse side first flank 14E is arranged in the vicinity of axis O so that the point closest to axis O on its surface coincides with axis O and so as to be surrounded by second through fourth flanks 14B, 14C and 14D in the region where both X and Y are negative. Reverse side second flank 14F is continuous with the rear side in the direction of drill rotation T of reverse side first flank 14E in the same manner as fourth flank 14D.

Intersecting ridgeline 19 of reverse side first flank 14E and reverse side second flank 14F is located along the X axis. Together with having axis O as inner peripheral edge 19A, intersecting ridgeline 19 extends roughly linearly from this inner peripheral edge 19A towards the outside in the radial direction, and the point that intersects with intersecting ridgeline 18 of fourth flank 14D and reverse side second flank 14F (i.e., inner peripheral edge 18A of intersecting ridgeline 18) is outer peripheral edge 19B.

Since reverse side first flank 14E is arranged surrounded by second through fourth flanks 14B, 14C and 14D in the region where both X and Y are negative, not only does it have intersecting ridgeline 19 with reverse side second flank 14F located in the region where X is negative and Y is positive, but it also has intersecting ridgeline 20 with second flank 14B and intersecting ridgeline 22 with fourth flank 14D.

Intersecting ridgeline 20 of reverse side first flank 14E and second flank 14B is located in the region where X and Y are both negative. Together with having axis O as inner peripheral edge 20A, intersecting ridgeline 20 extends roughly linearly from this inner peripheral edge 20A towards the outside in the radial direction, and the point that intersects with intersecting ridgeline 16 of second flank 14B and third flank 14C and intersecting ridgeline 17 of third flank 14C and fourth flank 14D (i.e., inner peripheral edge 16A of intersecting ridgeline 16, i.e., inner peripheral edge 17A of intersecting ridgeline 17) is outer peripheral edge 20B.

Intersecting ridgeline 22 of reverse side first flank 14E and fourth flank 14D is located in the region where both X and Y are negative. Inserting ridgeline 22 is roughly linear in parallel with the Y axis connected between outer peripheral edge 20B of intersecting ridgeline 20 of reverse side first flank 14E and second flank 14B (i.e., inner peripheral edge 16A of intersecting ridgeline 16, i.e., inner peripheral edge 17A of intersecting ridgeline 17), and outer peripheral edge 19B of intersecting ridgeline 19 of reverse side first flank 14E and reverse side second flank 14F (i.e., inner peripheral edge 18A of intersecting ridgeline 18 of fourth flank 14D and reverse side second flank 14F).

Reverse side first flank 14E is in roughly in the shape of a right triangle having for its three sides mutually perpendicular intersecting ridgeline 22 with fourth flank 14D, intersecting ridgeline 19 with reverse side second flank 14F, and intersecting ridgeline 20 with second flank 14B that intersects while inclining with these intersecting ridgelines 22 and 19.

With respect to reverse side first flank 14E, when outer peripheral edge 20B of intersecting ridgeline 20 with second flank 14B (i.e., inner peripheral edge 16A of intersecting ridgeline 16, i.e., inner peripheral edge 17A of intersecting ridgeline 17) is compared with outer peripheral edge 19B of intersecting ridgeline 19 with reverse side second flank 14F (i.e., inner peripheral edge 18A of intersecting ridgeline 18), outer peripheral edge 20B of intersecting ridgeline 20 is located farther away from axis O. This outer peripheral edge 20B is the point farthest away from axis O on reverse side first flank 14E.

Distance x between axis O and outer peripheral edge 20B of intersecting ridgeline 20 is set to be (1/3)D or less with respect to maximum outer diameter D of bit 10.

Reverse side second flank 14F is arranged extending across the region where X is negative and Y is positive and the region where both X and Y are positive so that the point closest to axis O on its surface coincides with axis O. The front section in the direction of drill rotation T of cutting discharge groove 11 is opened on the rear side in the direction of drill rotation T of reverse side second flank 14F.

The ridgeline on the rear side in the direction of drill rotation T of reverse side second flank 14F, namely intersecting ridgeline 23 between reverse side second flank 14F and a wall surface facing towards the rear side in the direction of drill rotation T in cutting discharge groove 11, has an outer peripheral edge 23B for the point that intersects with the outer peripheral surface of bit 10, and extends while curving in the manner of a projection from this outer peripheral edge 23B to the front side in the direction of drill rotation T moving towards the inside in the radial direction, and the point that intersects with cutting edge 13 in the vicinity of axis O (i.e., inner peripheral edge 13A of cutting edge 13) is inner peripheral edge 23A.

Since reverse side second flank 14F is arranged so as to reach to the region where both X and Y are positive, it has intersecting ridgeline 24 with first flank 14A. Intersecting ridgeline 24 is located in the region where both X and Y are negative. Together with having axis O for inner peripheral edge 24A, intersecting ridgeline 24 extends roughly linearly from this inner peripheral edge 24A towards the outside in the radial direction, and the point that intersects with cutting discharge groove 11 (i.e., inner peripheral edge 23A of intersecting ridgeline 23, i.e., inner peripheral edge 13A of cutting edge 13) is outer peripheral edge 24B.

Intersecting ridgeline 24 of reverse side second flank 14F and first flank 14A and intersecting ridgeline 20 of reverse side first flank 14E and second flank 14B are arranged so as to extend towards mutually roughly opposite sides with respect to axis O. In other words, this intersecting ridgeline 24 and intersecting ridgeline 20 are arranged roughly on the same line.

As shown in FIG. 2, tip flank 12, when viewed from the tip, is composed in the form of a multilevel surface as a result of arranging six flat flanks consisting of first through fourth flanks 14A, 14B, 14C and 14D and reverse side first and second flanks 14E and 14F as previously described. As shown in FIGS. 1 through 3, tip flank 12, when viewed from the side, has inclines respectively facing towards the tip in the direction of axis O approaching axis O with respect to these six flat flanks, and has inclines respectively facing toward the tip in the direction of axis O approaching axis O (moving towards the inside in the radial direction) on the intersecting ridgelines formed by the mutual intersecting of these flat flanks.

The point where the four flanks having the point closest to axis O on their surfaces located on axis O, namely first and second flanks 14A and 14B and reverse side first and second flanks 14E and 14F, mutually intersect (the point formed by the mutual intersection of the four intersecting ridgelines 15, 19, 20 and 24, i.e., inner peripheral edges 15A, 19A, 20A and 24A) is a leading edge protruding the farthest on the tip side in the direction of axis O in tip flank 12, and this leading edge is located on axis O (the distance between the leading edge in tip flank 12 and axis O is set to be zero).

The inclines (inclines so as to be facing towards the tip side in the direction of axis O approaching axis O) imparted to the pair of intersecting ridgelines 20 and 24 located on mutually roughly opposite sides juxtaposed about axis O among intersecting ridgelines 15, 19, 20 and 24 of the four flanks (first and second flanks 14A and 14B and reverse side first and second flanks 14E and 14F) are set to be mutually roughly identical, and set to be smaller than the inclines imparted to the other intersecting ridgelines 15 and 19.

The pair of intersecting ridgelines 20 and 24 among the four intersecting ridgelines 15, 19, 20 and 24 having inner peripheral surfaces 15A, 19A, 20A and 24A located on axis O are located farthest towards the tip side in the direction of axis O, and serve as chisel edges imparted with a predetermined tip angle.

As shown in FIGS. 1 and 3, with respect to the side view of bit 10, when a comparison is made between the distance a in the direction of axis O between outer peripheral edge 13B of cutting edge 13 and the leading edge of tip flank 12 (inner peripheral edges 15A, 19A, 20A and 24A), and the distance b in the direction of axis O between outer peripheral edge 15B of intersecting ridgeline 15 (of first flank 14A and second flank 14B) and the leading edge of tip flank 12, these distances are set to be such that a<b. A clearance angle is imparted to first flank 14A and second flank 14B continuous to the rear side in the direction of drill rotation T of cutting edge 13 so as to gradually become larger moving towards the rear side in the direction of drill rotation T from cutting edge 13.

In the present first embodiment, together with the clearance angle of first flank 14A being set to, for example, 15 degrees, the clearance angle of second flank 14B is set to 40 degrees.

As shown in FIGS. 1 and 3, with respect to the side view of bit 10, a comparison is made of distance c in the direction of axis O between outer peripheral edge 16B and intersecting ridgeline 16 (of second flank 14B and third flank 14C) and the leading edge of tip flank 12, distance d in the direction of axis O between outer peripheral edge 17B of intersecting ridgeline 17 (of third flank 14C and fourth flank 14D) and the leading edge of tip flank 12, distance e in the direction of axis O between outer peripheral edge 18B and intersecting ridgeline 18 (of fourth flank 14D and reverse side second flank 14F) and the leading edge of tip flank 12, and distance f in the direction of axis O between outer peripheral edge 23B of intersecting ridgeline 23 (of reverse side second flank 14F and a wall surface facing towards the rear side in the direction of drill rotation T in cutting discharge groove 11). Among these distances c, d, e and f, distance d is set to be the smallest, and when compared while including distances a and b, are set such that a<b<d<c, e<f. Recesses are imparted to second through fourth flanks 14B, 14C and 14D and reverse side second flank 14F so as to correspond to distances c, d, e and f.

Since the aforementioned intersecting ridgelines 16, 17, 18 and 23 are located in the region where X is negative (in the region on the opposite side from cutting edge 13 juxtaposed about the Y axis) when viewed from the tip in the direction of axis O, among these intersecting ridgelines 16, 17, 18 and 23, intersecting ridgeline 17, which has outer peripheral edge 17 that has the smallest distance in the direction of axis O from the leading edge of tip flank 12, is located the farthest towards the tip in the direction of axis O in the region where X is negative when viewed from the tip in the direction of axis O.

FIG. 4 shows the rotation loci about axis O of a pair of intersecting ridgelines 20 and 24 that form a chisel edge, the rotation loci about axis O of cutting edge 13, and the rotation loci about axis O of outer peripheral edges 15B, 16B, 17B, 18B and 23B of intersecting ridgelines 15, 16, 17, 18 and 23. The pair of intersecting ridgelines 20 and 24 are made to recede at roughly mutually the same change in inclination towards the rear end in the direction of axis O moving towards the outside in the radial direction. Outer peripheral edge 13B of cutting edge 13 is located farther to the tip side in the direction of axis O than outer peripheral edges 15B, 16B, 17B, 18B and 23B of intersecting ridgelines 15, 16, 17, 18 and 23.

In bit 10, the outer peripheral surface excluding cutting discharge groove 11 is composed of a margin section 25 having a roughly arc-shaped cross-section centered on axis O that intersects with a wall surface facing towards the front side in the direction of drill rotation T in cutting discharge groove 11, and a body clearance 26 having a roughly arc-shaped cross-section centered on axis O that intersects with the outer peripheral ridgeline section of the wall surface facing towards the rear side in the direction of drill rotation T in cutting discharge groove 11 and has an outer diameter that is one step smaller than the arc formed by margin section 25.

Margin section 25 and body clearance 26 are formed so as to be twisted in a spiral shape centered on axis O towards the rear side in the direction of drill rotation T moving from the tip to the rear end of bit 10 in the same manner as discharge cutting groove 11, and are formed over the entire region of effective length L of bit 10.

When viewed from the tip side in the direction of axis O, since the portion where body clearance 26 intersects with tip flank 12 is located in the region where X is negative and Y is positive, the aforementioned intersecting ridgelines 18 and 23 have outer peripheral edges 18B and 23B as the points that intersect with body clearance 26, while the aforementioned cutting edge 13 and intersecting ridgelines 15, 16 and 17 have outer peripheral edges 13B, 15B, 16B and 17B as points that intersect with margin section 25.

As a result of imparting feeding towards the tip in the direction of axis O while the drill body is rotated around axis O, a small drill composed in the manner described above drills a drilled material with a single cutting edge 13 formed on bit 10, and a small diameter, deep hole is drilled by discharging cuttings generated by this cutting edge 13 to the rear side of bit 10 along cutting discharge groove 11.

The differences b–a, c–a, d–a, e–a and f–a between each of the distances b, c, d, e and f in the direction of axis O between the aforementioned intersecting ridgelines 15, 16, 17, 18 and 23 and the leading edge of tip flank 12, and distance a in the direction of axis O between outer peripheral edge 13B of cutting edge 13 and the leading edge of tip flank 12, are each set to be larger than a feeding amount F (μm/rev.) by which the drill body is moved towards the tip side in the direction of axis O for each revolution around axis O by the drill body.

During this drilling, the leading edge of tip flank 12 (inner peripheral edges 15A, 19A, 20A and 23A) located on axis O first contact the drilled material and cut into it. Subsequently, the location of contact with the drilled material extends from axis O towards the outside in the radial direction along a pair of intersecting ridgelines 20 and 23 (chisel edges). Finally, as a result of roughly the entire length of cutting edge 13 contacting the drilled material extending from inner peripheral edge 13A of cutting edge 13 intersecting with outer peripheral edge 23B of intersecting ridgeline 23 to outer peripheral edge 13B, the drilled material is cut into by this cutting edge 13 and drilling progresses. At this time, since outer peripheral edge 13B of cutting edge 13 is located farther towards the tip in the direction of axis O than outer peripheral edges 15B, 16B, 17B, 18B and 23B of other intersecting ridgelines 15, 16, 17, 18 and 23, it contacts the drilled material sooner than these outer peripheral edges 15B, 16B, 17B, 18B and 23B.

With respect to the region (region where X is negative) on the opposite side of cutting edge 13 juxtaposed about the Y axis when viewed from the tip in the direction of axis O, together with tip flank 12 of bit 10 being in the form of a multilevel surface in which second through fourth flanks 14B, 14C and 14D as well as reverse side second flank 14F are arranged along the peripheral direction, intersecting ridgeline 17, which is one of the intersection ridgelines 16, 17 and 18 of these flanks, is located farthest towards the tip in the direction of axis O. Consequently, at least one portion of this intersecting ridgeline 17 on the inside in the radial direction (for example, roughly half the length) makes contact with the drilled material in the same manner as cutting edge 13. (In addition, at least one portion on the inside in the radial direction of intersecting ridgeline 16 of second flank 14B and third flank 14C may also be made to contact the drilled material.)

During drilling, since intersecting ridgelines 17 contacts the drilled material, in this first embodiment of the present invention, the difference d–a between distance d in the direction of axis O between outer peripheral edge 17B of intersecting ridgeline 17 and the leading edge of tip flank 12 and distance a in the direction of axis O between outer peripheral edge 13B of cutting edge 13 and the leading edge of tip flank 12 is set to within the range of, for example, 2–500 μm, and the feeding amount F imparted to the drill body is set to, for example, 1–100 μm/rev.

In a small drill of the first embodiment of the present invention as described above, since there is only one cutting discharge groove 11 provided in its bit 10, an adequate core thickness can be ensured for bit 10. Consequently, the rigidity of the drill body can be maintained at an overwhelmingly larger level as compared with a small drill provided with two cutting discharge grooves, and breakage of bit 10 and hole curvature caused by insufficient rigidity can be inhibited.

When drilling a drilled material using this small drill, since the drilled material is cut into from a single point (inner peripheral edge 15A, 19A, 20A and 24A) located on axis O that serves as the leading edge of tip flank 12, cutting in the form of linear contact with a chisel edge extending in a direction that intersects with an axis as in the prior art, or cutting into the drilled material from one edge of a chisel edge does not occur, thereby making it possible to inhibit whirling of the drill body.

In a small drill of the first embodiment, in addition to be able to ensure a high level of rigidity, a high degree of linearity can be obtained without causing runout of the drill body. Consequently, a high level of hole positional accuracy can be obtained even if the maximum diameter D of bit 10 is 1 mm or less and ratio LAD of the effective length L of bit 10 to the maximum diameter D of bit 10 is set to 5 or more as in the case of using for drilling small diameter holes in which the diameter of the drilled hole is 1 mm or less and the ratio of hole depth to hole diameter is 5 or more.

In this first embodiment, although a single point that serves as the leading edge of tip flank 12 is made to be located on axis O (the distance between the leading edge of tip flank 12 and axis O is zero), the present invention is not limited to this. If the distance between a single point that serves as the leading edge of tip flank 12 and axis O is set to within the range of (5/100)D or less, the aforementioned effects can be demonstrated without being compromised in any way even if the leading edge deviates from axis O.

When bit 10 is viewed from the tip side in the direction of axis O, the portion of tip flank 12 located in the region where both X and Y are negative is in the form of a multilevel surface composed of second through fourth flanks 14B, 14C and 14D arranged in the peripheral direction and reverse side first flank 14E surrounded by these second through fourth flanks 14B, 14C and 14D. In addition, bit 10 is composed such that, together with the point closest to axis O on reverse side first flank 14E coinciding with axis O, third and fourth flanks 14C and 14D are arranged on the outside in the radial direction of this reverse side first flank 14E.

As a result of employing a constitution in which reverse side first flank 14E that contains axis O is formed on the inside in the radial direction of third and fourth flanks 14C and 14D, even in the case a processing error occurs when forming these third and fourth flanks 14C and 14D, this processing error can be absorbed the amount reverse side first flank 14E is formed.

In other words, the risk of these third and fourth flanks 14C and 14D being formed beyond axis O is reduced, and accompanying this, the state in which a single point that serves as the leading edge of tip flank 12 deviates from axis O can be decreased.

Reverse side first flank 14E may be formed to be as small as possible, and in the extreme case, may not be formed at all (i.e., the distance x between a point farthest from axis O on reverse side first flank 14E and axis O may be zero). However, in consideration of the aforementioned processing error, this reverse side first flank 14E is preferably formed at a size within the range in which distance x between a point farthest from axis O on reverse side first flank 14E and axis O when bit 10 is viewed from the tip side in the direction of axis O is (1/3)D or less with respect to the maximum diameter D of bit 10.

If distance x between a point farthest from axis O on reverse side first flank 14E and axis O is greater than (1/3)D, there is the risk of not being able to impart an adequate recess to the region where both X and Y are negative, resulting in excessive interference with the drilled material and the risk of impairing drilling.

In addition, since the pair of intersecting ridgelines 20 and 24 serving as a chisel edges are located on mutually roughly opposite sides juxtaposed about axis O, and recede to the rear side in the direction of axis O at mutually roughly the same change in inclination, prior to cutting edge 13 contacting the drilled material, the pair of intersecting ridgelines 20 and 24 respectively guide the drill body by uniformly contacting the drilled material. Consequently, the linearity of the drill body is further enhanced, thereby allowing the obtaining of better hole positional accuracy.

In addition, since outer peripheral edge 13B of cutting edge 13 contacts the drilled material sooner than outer peripheral edges 15B, 16B, 17B, 18B and 23B of the other intersecting ridgelines 15, 16, 17, 18 and 23, inner wall surface accuracy of drilled holes can be improved.

Next, although the following provides an explanation of a second embodiment of the present invention, the same reference symbols are used for those portions that are the same as the aforementioned first embodiment, and their explanation is omitted.

Figure 5:
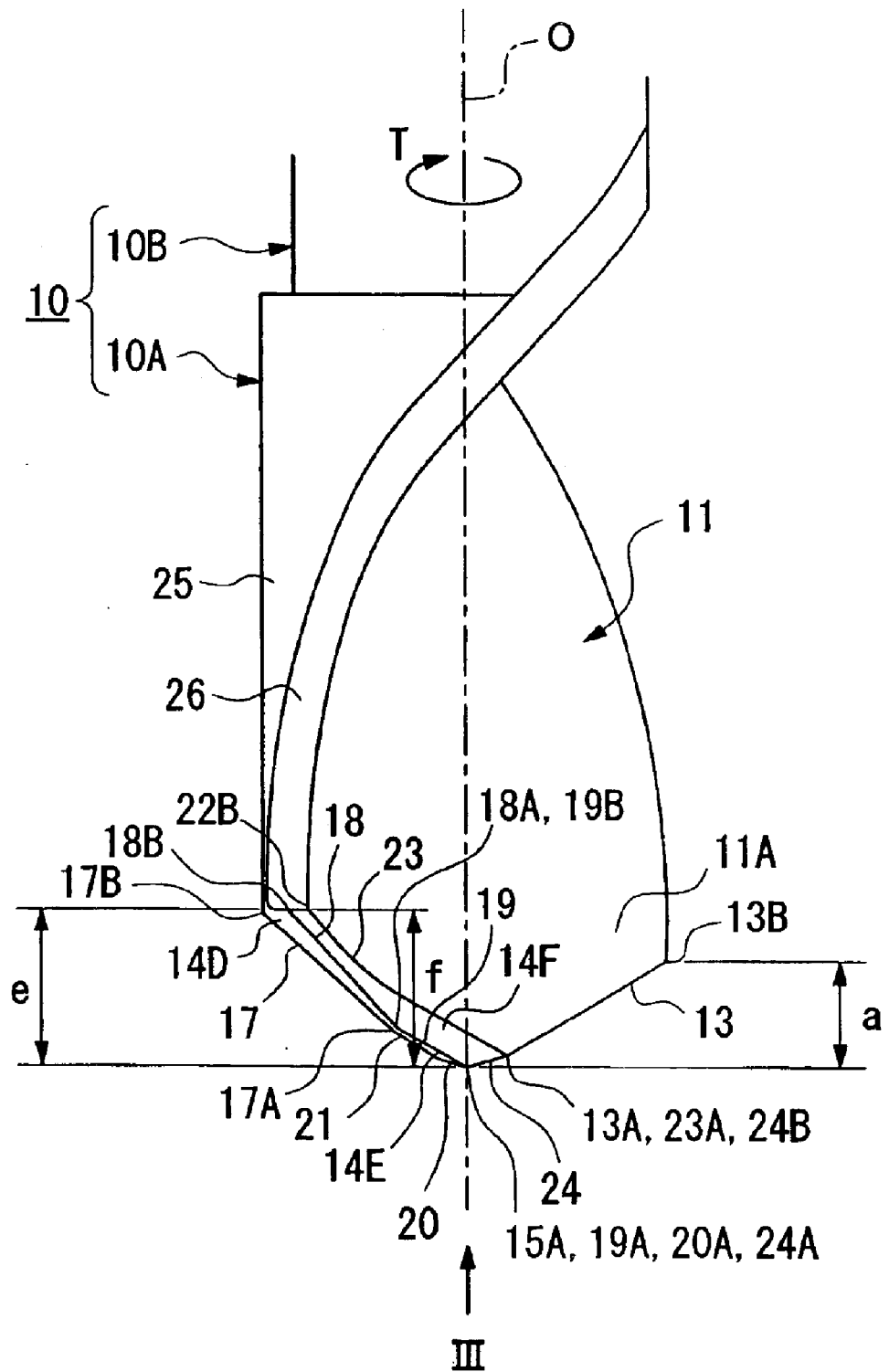
FIG. 5 is an enlarged side view of the essential portion of the bit of a small drill according to a second embodiment of the present invention.
Figure 6:
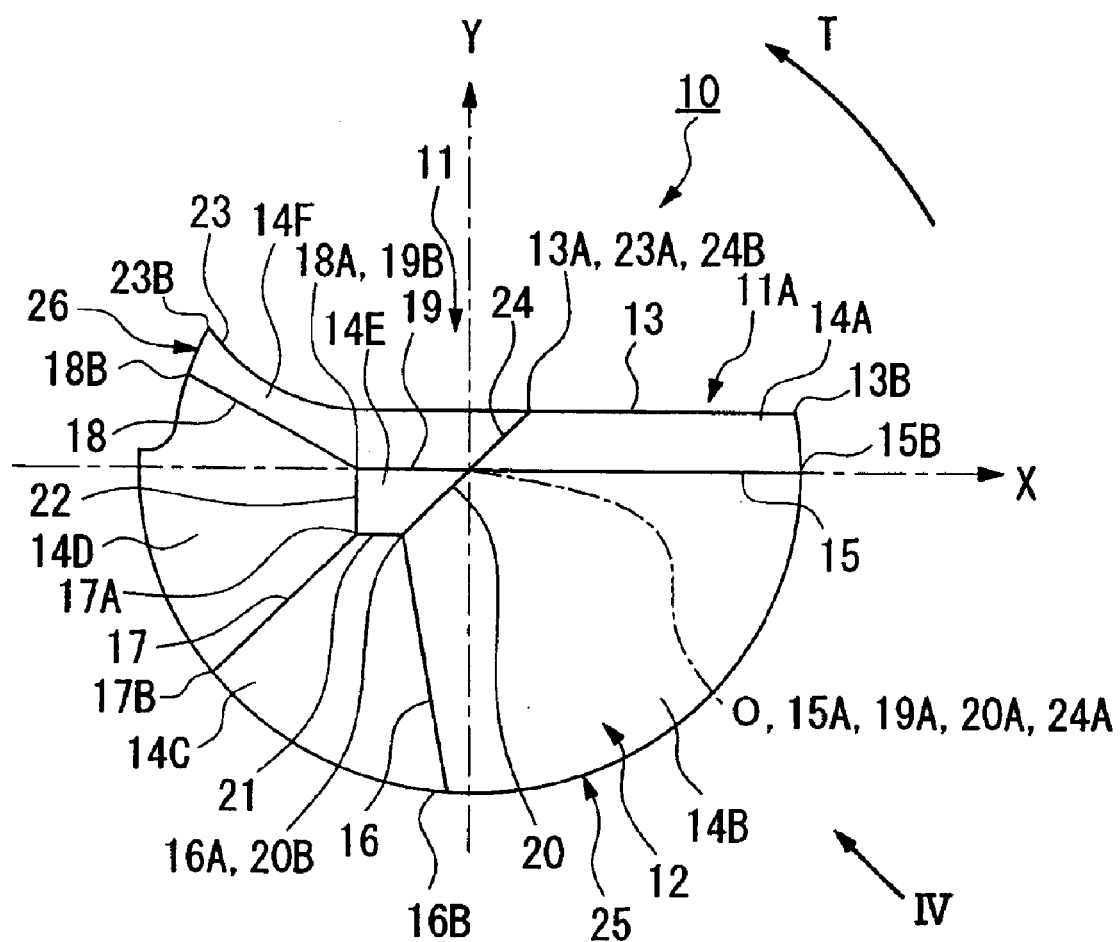
FIG. 6 is a view taken along the direction of arrow III in FIG. 5.
Figure 7:
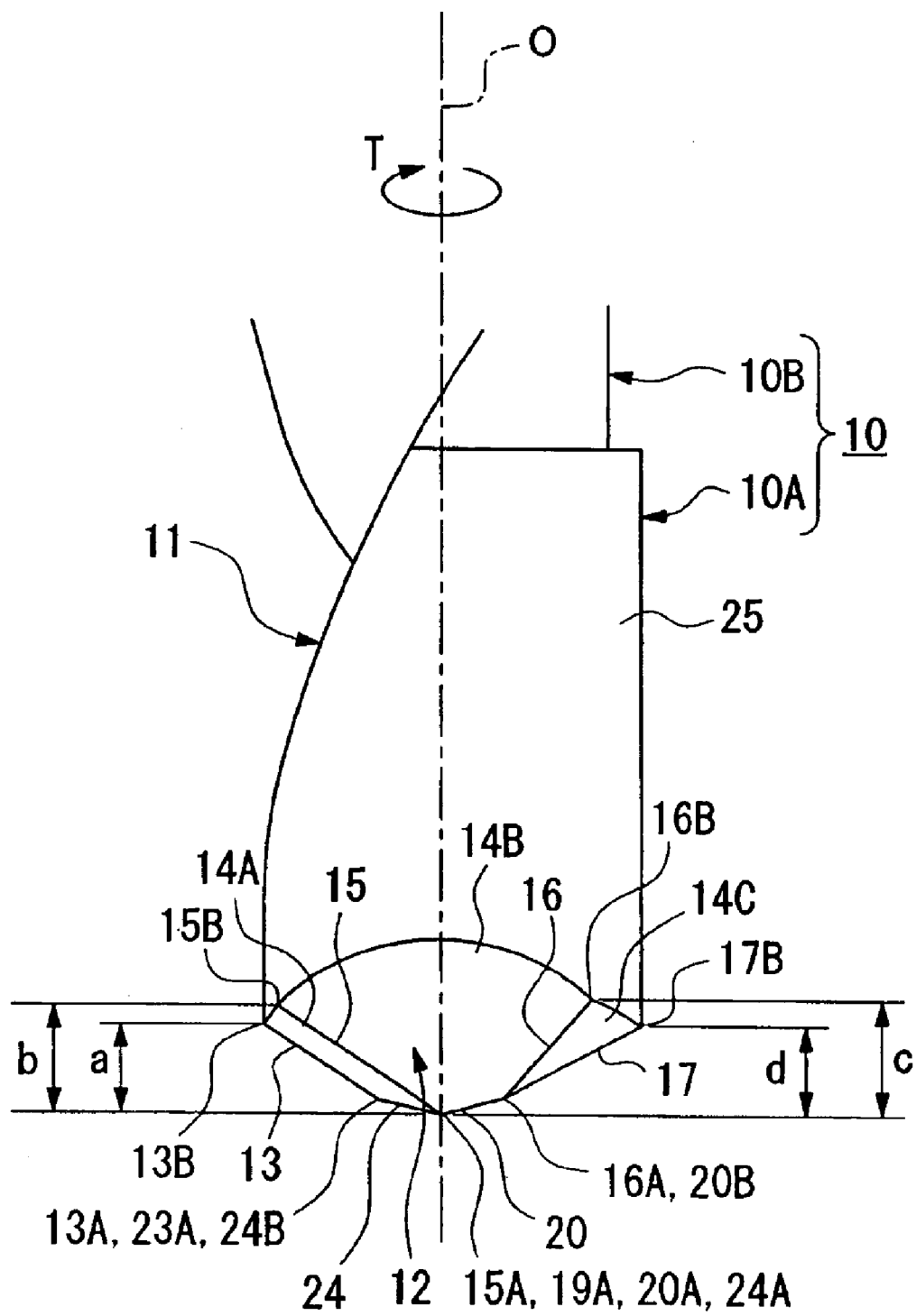
FIG. 7 is a view taken along the direction of arrow IV in FIG. 6.

FIG. 5 is an enlarged side view of the essential portion of the bit of a small drill according to a second embodiment of the present invention. FIG. 6 is a view taken along the direction of arrow m in FIG. 5. FIG. 7 is a view taken along the direction of arrow IV in FIG. 6.

Bit 10 serving as the tip section of the drill body of a small drill according to the present second embodiment is discussed when viewed from the tip side in the direction of axis O.

Intersecting ridgeline 16 of second flank 14B and third flank 14C and intersecting ridgeline 17 of third flank 14C and fourth flank 14D are compared. With respect to the locations of their inner peripheral edges 16A and 17A (located closest to axis O on each intersecting ridgeline 16 and 17), inner peripheral edge 17A of intersecting ridgeline 17 is farther from axis O than inner peripheral edge 16A of intersecting ridgeline 16. The inclination towards the front side in the direction of drill rotation T moving towards the outside in the radial direction is smaller for intersecting ridgeline 17 than intersecting ridgeline 16.

Since reverse side first flank 14E is arranged surrounded by second through fourth flanks 14B, 14C and 14D in the region where both X and Y are negative, not only does it have an intersecting ridgeline 19 with reverse side second flank 14F located in the region where X is negative and Y is positive, but it also has an intersecting ridgeline 20 with second flank 14B, an intersecting ridgeline 21 with third flank 14C and an intersecting ridgeline 22 with fourth flank 14D.

The intersecting ridgeline 20 of reverse side first flank 14E and second flank 14B is located in the region where X and Y are both negative. Together with having axis O as inner peripheral edge 20A, intersecting ridgeline 20 extends roughly linearly from this inner peripheral edge 20A towards the outside in the radial direction, has outer peripheral edge 20B as the point that intersects with intersecting ridgeline 16 of second flank 14B and third flank 14C (i.e., inner peripheral edge 16A of intersecting ridgeline 16).

Intersecting ridgeline 21 of reverse side first flank 14E and third flank 14C is located in the region where X and Y are both negative. Intersecting ridgeline 21 is roughly in the form of a straight line parallel to the X axis that connects inner peripheral edge 16A of intersecting ridgeline 16 of second flank 14B and third flank 14C (outer peripheral edge 20B of intersecting ridgeline 20), and inner peripheral edge 17A of intersecting ridgeline 17 of third flank 14C and fourth flank 14D.

Intersecting ridgeline 22 of reverse side first flank 14E and fourth flank 14D is located in the region where X and Y are both negative. Intersecting ridgeline 22 is roughly in the form of a straight line parallel to the Y axis that connects inner peripheral edge 17A of intersecting ridgeline 17 of third flank 14C and fourth flank 14D, and inner peripheral edge 18A of intersecting ridgeline 18 of fourth flank 14D and reverse side second flank 14F (outer peripheral edge 19B of intersecting ridgeline 19 of reverse side first flank 14E and reverse side second flank 14F).

Reverse side first flank 14E is roughly in the form of a right trapezoid (roughly quadrangular shape) having four sides consisting of intersecting ridgeline 21 with mutually parallel third flank 14C, intersecting ridgeline 19 with reverse side second flank 14F, intersecting ridgeline 22 with fourth flank 14D that intersects at right angle with these intersecting ridgelines 21 and 19, and intersecting ridgeline 20 with second flank 14B that intersects on an incline with intersecting ridgelines 21 and 19.

In a small drill employing the constitution described above, with respect to the region on the opposite side from cutting edge 13 juxtaposed about the Y axis (region where X is negative) when viewed from the tip side in the direction of axis O, together with tip flank 12 being in the form of a multilevel surface in which second through fourth flanks 14B, 14C and 14D and reverse side second flank 14F are arranged along the peripheral direction, intersecting ridgeline 17, which is one of intersecting ridgelines 16, 17 and 18 of these flanks, is located farthest towards the tip in the direction of axis O. Consequently, at least a portion of this intersecting ridgeline 17 on the inside in the radial direction (e.g., roughly half its length) is made to contact a drilled material in the same manner as cutting edge 13.

Since intersecting ridgeline 17 contacts the drilled material during drilling, in the present second embodiment, the difference d-a between distance d in the direction of axis O between outer peripheral edge 17B of intersecting ridgeline 17 and the leading edge of tip flank 12 and distance a in the direction of axis O between outer peripheral edge 13B of cutting edge 13 and the leading edge of tip flank 12 is set to within the range of, for example, 2–200 µm, and the feeding amount F imparted to the drill body is set to, for example, 1–100 µm/rev.

A small drill of the present second embodiment as described above is able to demonstrate identical effects with the portion that employs the same constitution as the aforementioned first embodiment.

In addition, when drilling a drilled material using a small drill of the present second embodiment, in addition to a single cutting edge 13 formed on bit 10, roughly half on the inside in the radial direction of intersecting ridgeline 17 of third flank 14C and fourth flank 14D is made to contact the drilled material.

As a result, intersecting ridgeline 17, which is located in the region where both X and Y are negative on the opposite side juxtaposed about axis O with respect to the region where both X and Y are positive where cutting edge 13 is located, contacts the drilled material to as to inhibit runout of the drill body, thereby making it possible to continuously maintain the drill body in a stable state during drilling of the drilled material.

In a small drill of the present second embodiment, in addition to being able to ensure high rigidity, the drill body can be continuously maintained in a stable state without allowing the occurrence of runout. Consequently, a high level of hole positional accuracy can be obtained even if the maximum diameter D of bit 10 is 1 mm or less and ratio L/D of the effective length L of bit 10 to the maximum diameter D of bit 10 is set to 5 or more as in the case of using for drilling small diameter holes in which the diameter of the drilled hole is 1 mm or less and the ratio of hole depth to hole diameter is 5 or more.

By setting difference d−a between distance d in the direction of axis O between outer peripheral edge 17B of intersecting ridgeline 17 that contacts the drilled material and the leading edge of tip flank 12 and distance a in the direction of axis O between outer peripheral edge 13B of cutting edge 13 and the leading edge of tip flank 12 to be larger than the feeding amount F imparted to the drill body during drilling, a suitable contact state can be maintained between this intersecting ridgeline 17 and the drilled material.

Conversely, if the aforementioned difference d−a is smaller than the aforementioned feeding amount F, there is excessive interference between intersecting ridgeline 17 and the drilled material, thereby resulting in the risk of impairing drilling.

In the present second embodiment, although the intersecting ridgeline of corresponding flanks that contacts the drilled material during drilling is taken to be a single intersecting ridgeline 17 of the third flank 14C and fourth flank 14D, in addition to this, at least a portion on the inside in the radial direction of intersecting ridgeline 16 of second flank 14B and third flank 14C may be also made to contact the drilled material.

With respect to the intersecting ridgeline of corresponding flanks that is made to contact the drilled material, when viewed from the tip side in the direction of axis O, by composing a portion of tip flank 12 in the reaction on the opposite side from cutting edge 13 juxtaposed about the Y axis with a plurality of flanks arranged in the peripheral direction, at least one should be present in this region (and more preferably, in the region where X and Y are both negative).

Although the following provides an explanation of a third embodiment of the present invention, the same reference symbols are used for those portions that are the same as the aforementioned first and second embodiments, and their explanations are omitted.

Figure 8:
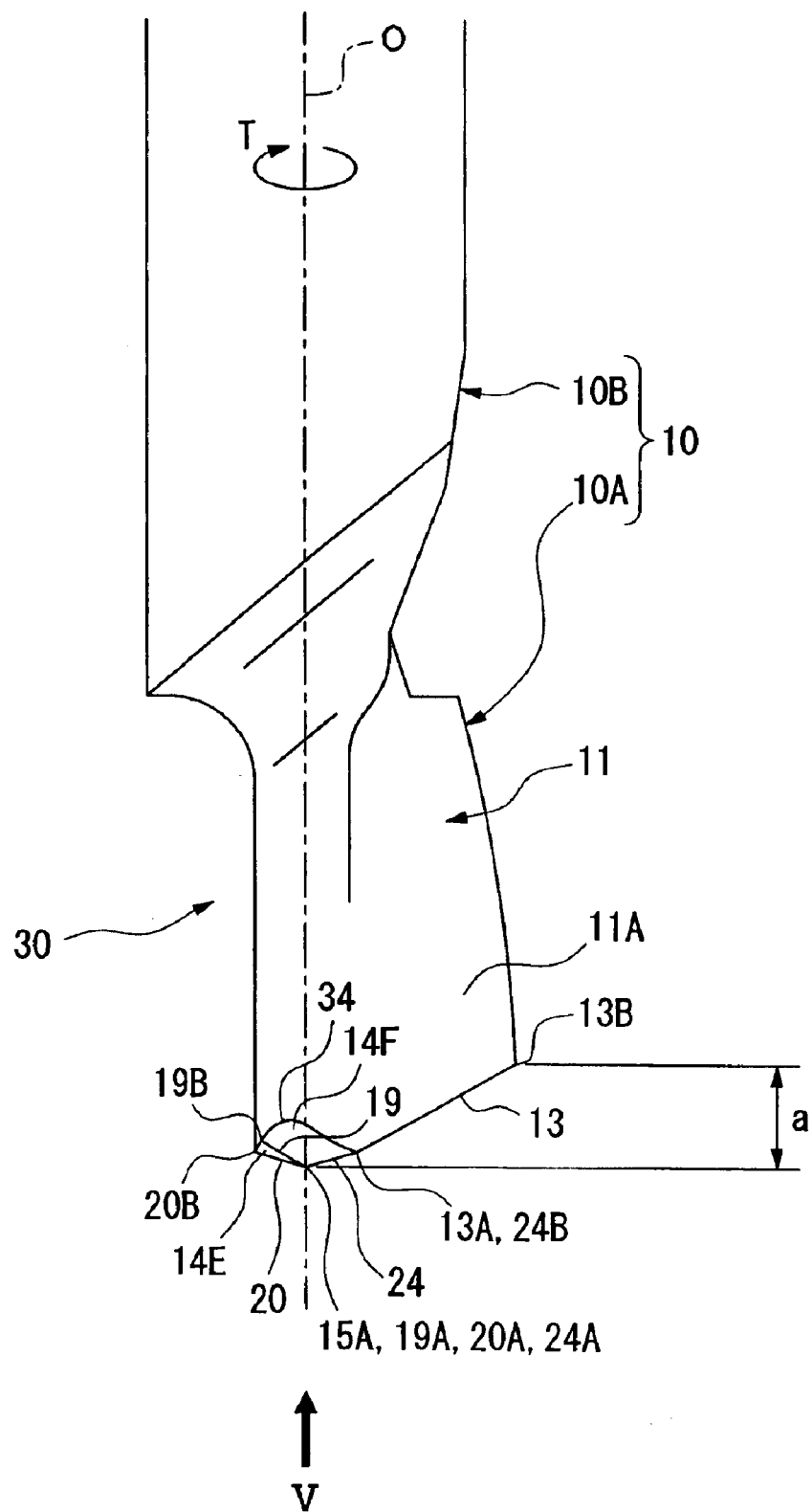
FIG. 8 is an enlarged side view of the essential portion of the bit of a small drill according to a third embodiment of the present invention.
Figure 9:
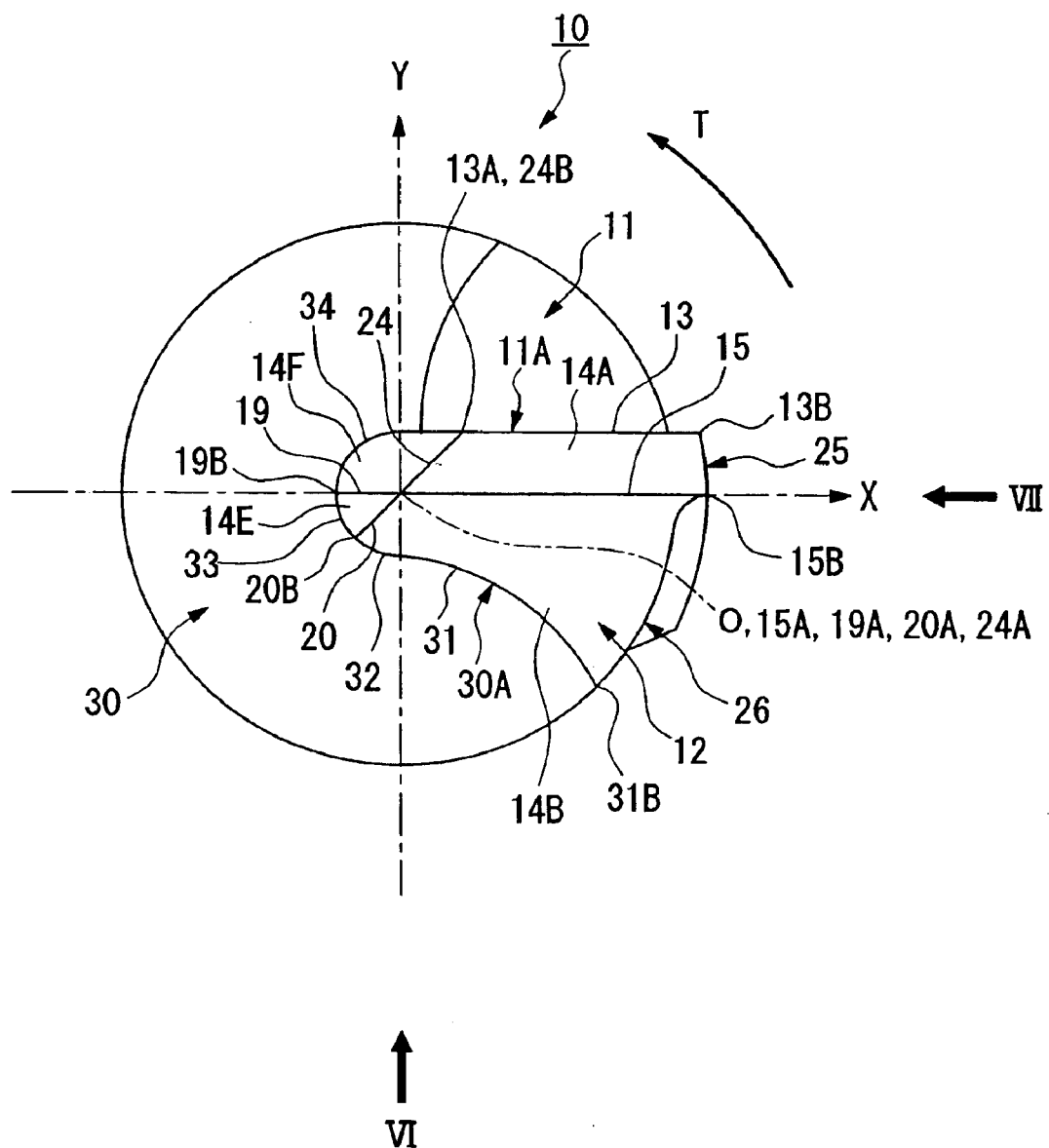
FIG. 9 is a view taken along the direction of arrow V in FIG. 8.
Figure 10:
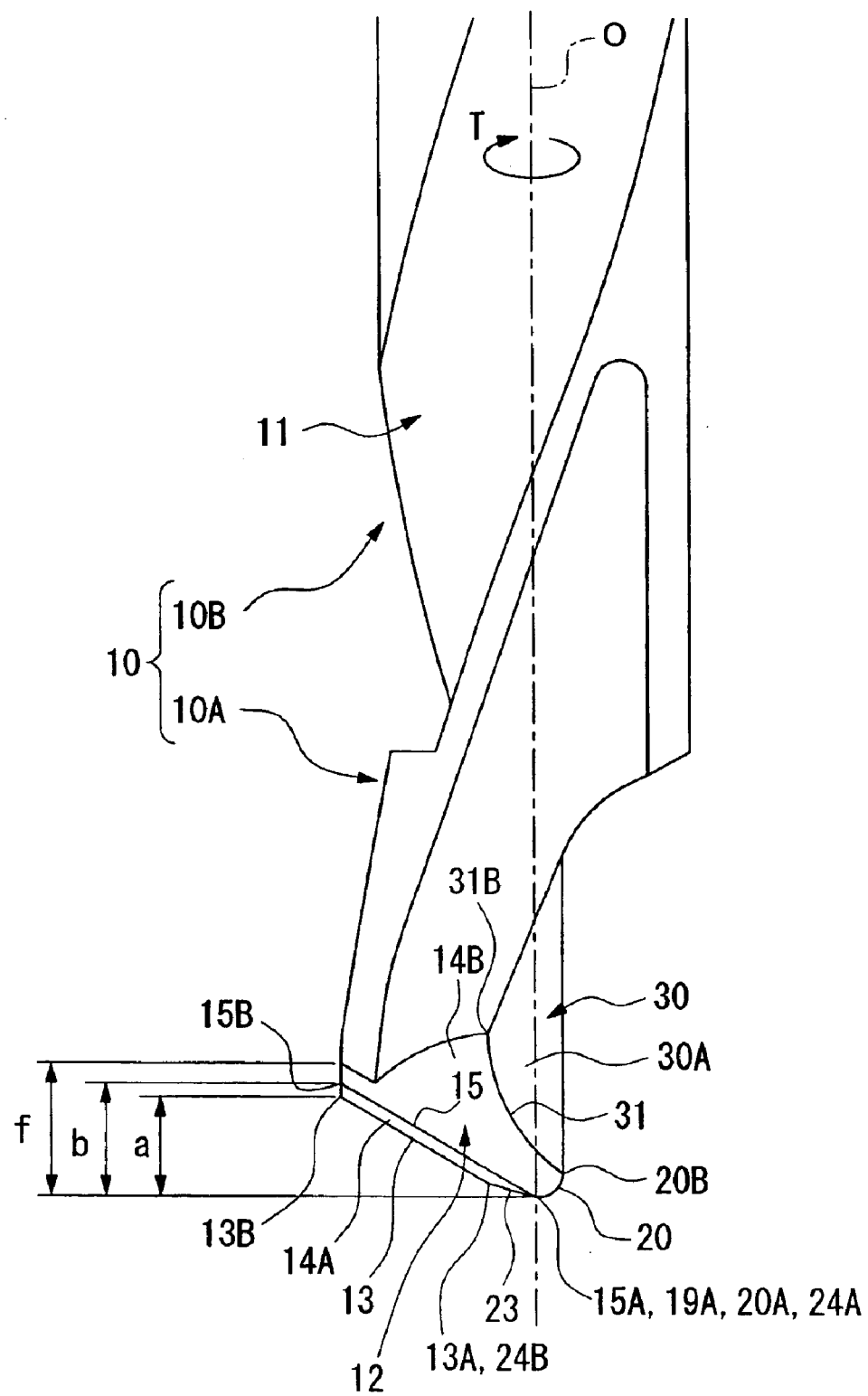
FIG. 10 is a view taken along the direction of arrow VI in FIG. 9.
Figure 11:
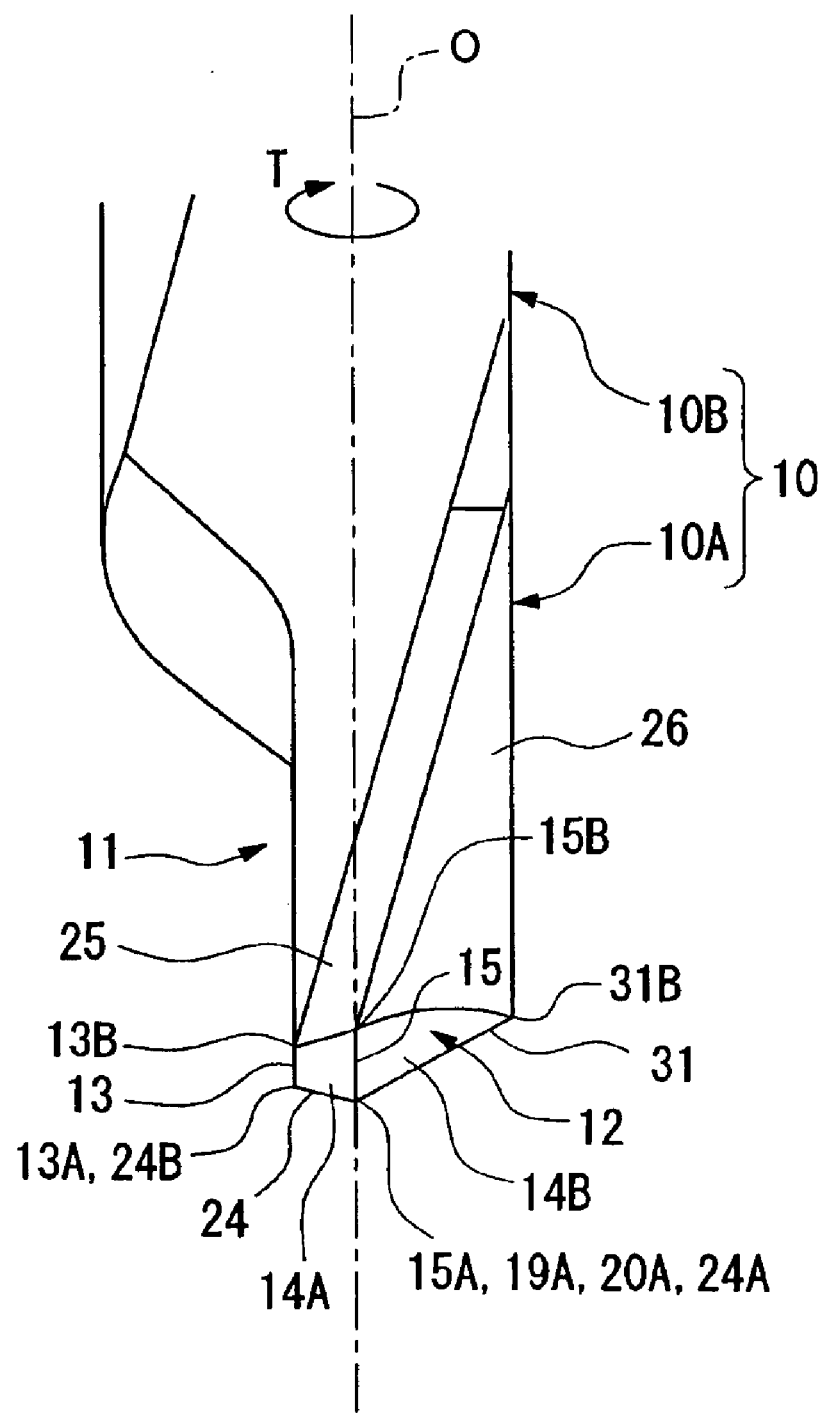
FIG. 11 is a view taken along the direction of arrow VII in FIG. 9.

FIG. 8 is an enlarged side view of the essential portion of the bit of a small drill according to a third embodiment of the present invention. FIG. 9 is a view taken along the direction of arrow V in FIG. 8. FIG. 10 is a view taken along the direction of arrow VI in FIG. 9. FIG. 11 is a view taken along the direction of arrow VII in FIG. 9.

As shown in FIGS. 8 through 11, tip flank 12 of bit 10 and a single auxiliary groove section 30 that opens to the outer peripheral surface are formed in the outer periphery of bit 10 of a small drill according to the present third embodiment so as not to contain axis O while extending from the tip of bit 10 towards the rear end and being continuous on the front side in the direction of drill rotation T with cutting discharge groove 11. Although auxiliary groove section 30 faces from the tip towards the rear side of bit 10 in the same manner as cutting discharge groove 11, it is twisted into a spiral shape centering on axis O towards the rear side in the direction of drill rotation T.

As shown in FIG. 9 viewed from the tip side in the direction of axis O, auxiliary groove section 30 extends towards the front side in the direction of drill rotation T from a portion continuous with cutting discharge groove 11 located in the region where X is negative and Y is positive, while leaving the periphery of axis O in tip flank 12 in a roughly semicircular shape. A wall surface 30A facing towards the rear side in the direction of drill rotation T in auxiliary groove section 30 (and curved so as to protrude towards the front side in the direction of drill rotation T) is made to intersect with tip flank 12 in the region where X is positive and Y is negative.

As shown in FIG. 9, tip flank 12, which is in the form of a multilevel surface composed of a plurality of flat flanks, is in the form of a multilevel surface composed of a total of four flat surfaces, and is composed by arranging flat surfaces in the form of first and second flanks 14A and 14B sequentially along the peripheral direction from cutting edge 13 towards the rear side in the direction of drill rotation T, and in the vicinity of axis O, together with arranging a flat surface in the form of reverse side first flank 14E on the rear side in the direction of drill rotation T of second flank 14B, has a flat surface in the form of reverse side second flank 14F arranged on the rear side in the direction of drill rotation T of this reverse side first flank 14E.

In addition, in second flank 14B arranged across the region where X is positive and Y is negative and the region where X and Y are both negative, the portion on the front side in the direction of drill rotation T of an auxiliary groove section 30 is open on the rear side in the direction of drill rotation T of the portion located in the region where X is positive and Y is negative, and reverse side first flank 14E is continuous on the rear side in the direction of drill rotation T with the portion located in the region where X and Y are both negative.

A ridgeline on the rear side in the direction of drill rotation T of the portion located in the region where X is positive and Y is negative in second flank 14B, namely intersecting ridgeline 31 between second flank 14B and a wall surface 30A facing towards the rear side in the direction of drill rotation T in auxiliary groove section 30, has the point that intersects with the outer peripheral surface of bit 10 as outer peripheral edge 31B, and is connected to intersecting ridgeline 32 to be described later by extending from this outer peripheral edge 31B while curving so as to protrude to the front side in the direction of drill rotation T moving towards the inside in the radial direction.

A roughly semicircular arc centering on axis O is composed by an outer peripheral ridgeline of the portion located in the region where X and Y are both negative in second flank 14B (intersecting ridgeline 32 between the portion located in the region where X and Y are both negative in second flank 14B and the wall surface of auxiliary groove section 30), the outer peripheral ridgeline of reverse side first flank 14E (intersecting ridgeline 33 between reverse side first flank 14E and the wall surface of auxiliary groove section 30), and the outer peripheral ridgeline of the portion located in the region where X is negative and Y is positive in reverse side second flank 14F (intersecting ridgeline 34 between the portion located in the region where X is negative and Y is positive in reverse side second flank 14F and the wall surface of auxiliary groove section 30).

As a result of auxiliary groove section 30 of bit 10 being formed, tip flank 12 located in the region where X is negative (portion located in the region where X is negative in second flank 14B, reverse side first flank 14E, portion located in the region where X is negative in reverse side second flank 14F) has a roughly semicircular shape centering on axis O when viewed from the tip side in the direction of axis O.

When viewed from the tip side in the direction of axis O, since the portions of margin section 25 and body clearance 26 that compose the outer peripheral surface except for cutting discharge groove 11 and auxiliary groove section 30 in bit 10 where body clearance 26 intersects with tip flank 12 are located in the region where X is positive and Y is negative, the point where the aforementioned intersecting ridgeline 31 intersects with body clearance 26 is outer peripheral edge 31B.

Auxiliary groove section 30 extends while twisting to the rear side in the direction of drill rotation T as it moves from the tip to the rear end side of bit 10 in the same manner as cutting discharge groove 11. However, as a result of its twist angle suddenly becoming larger in the vicinity of the site where it reaches first bit section 10A and second bit section 10B, it is cut upward to a wall surface facing the rear side in the direction of drill rotation T in cutting discharge groove 11 that is continuous on the rear side in the direction of drill rotation T of auxiliary groove section 30.

In addition to being able to obtain the same effects at those sections that employ the same constitution as the aforementioned first and second embodiments, a small drill of the present third embodiment as described above makes it possible to facilitate a regrinding process of tip flank 12.

In other words, when cutting edge 13 and tip flank 12 have become worn as a result of continuation of drilling, in the case of attempting to reuse the small drill by regrinding tip flank 12 with a grindstone, tip flank 12 to be ground only becomes smaller at the section where auxiliary groove section 30 is formed. Consequently, the number of plurality of flanks that compose tip flank 12 is reduced (in contrast to a small drill of the first and second embodiments having a tip flank 12 in the form of a multilevel surface composed of a total of six flat flanks, tip flank 12 of a small drill of the third embodiment is in the form of a multilevel surface composed of a total of four flat flanks), the number of flanks to be ground is reduced, and the time and trouble required for regrinding can be decreased.

Since auxiliary groove section 30 presents a groove shape extending towards from the tip to the rear end side of bit 10 in the same manner as cutting discharge groove 11 even after regrinding of tip flank 12, the shapes of cutting edge 13 and tip flank 12 can be maintained the same, thereby preventing any changes in drilling performance.

Auxiliary groove section 30 is cut upward to cutting discharge groove 11 at the portion where it goes beyond first bit section 10A and reaches second bit section 10B, and is not formed over the entire effective length L of bit 10. As a result, the rigidity of the drill body is not lowered beyond that which is necessary, and since the mutual space between this auxiliary groove section 30 and cutting discharge groove 11 is continuous, the discharge of cuttings can be satisfactorily maintained even at the tip of bit 10 where clogging of cuttings occurs easily.

Although the explanations in each of the aforementioned embodiments described bit 10 in the form of an undercut type, bit 10 is not limited to this. Bit 10 may be a straight type in which the outer diameter D of bit 10 remains constant from its tip to its rear end, or it may have a back taper such that the outer diameter of bit 10 gradually becomes smaller moving from the tip towards the rear end (in this case, the outer diameter at the tip section of bit 10 becomes the maximum outer diameter D).

Although the explanations in each of the aforementioned embodiments described a small drill in which the maximum outer diameter D of the bit is 1 mm or less, and the ratio L/D of effective length L to maximum outer diameter D is 5 or more, these parameters are not limited to these ranges. The aforementioned effects can also be demonstrated by applying the present invention to a drill having a larger maximum outer diameter D or a drill having an L/D ratio that is less than 5.

EXPERIMENTAL EXAMPLE

A drilling test was conducted on a drilled material using a small drill according to an example of the present invention (small drill based on the aforementioned first embodiment) as an experimental example, and a small drill of the prior art in the form of a single flute drill in which a roughly linear chisel edge extending in a direction perpendicular to the axis is formed on the leading edge of a tip flank as an example of the prior art.

In both the experimental example and example of the prior art, drilling was performed by attaching an entry board (LE400 having a thickness of 0.2 mm) and a back up board to a substrate (consisting of four double-sided boards having a thickness of 0.2 mm and made of BT resin layered on top of each other) serving as the drilled material using a small drill having a bit maximum outer diameter D of 0.11 mm. The drilled material was drilled at a drill rotating speed of 155,000 $min^{-1}$ and a feeding amount F of 9.01 µm/rev. without using step feeding, and the amount of deviation from the target location of the location where the small drill came through the substrate was plotted by measuring for 3000 holes in 500 hole increments.

The results of the drilling test using the experimental example are shown in FIG. 12, while the results of the drilling test using the example of the prior art are shown in FIG. 13.

In the case of the experimental example shown in FIG. 12, results were obtained in which stable and satisfactory hole positional accuracy was able to be obtained for up to 3000 holes. In contrast, in the case of the example of the prior art shown in FIG. 13, due to the presence of the roughly linear chisel edge extending in a direction perpendicular to the axis, runout of the drill body occurred when the drill cut into the drilled material, thereby leading to the result in which satisfactory hole positional accuracy was unable to be obtained.

What is claimed is:

1. A drill comprising: a cutting discharge groove extending from the tip to the rear end of a bit formed in the outer periphery of the bit serving as the tip of a drill body that is rotated around an axis, and a cutting edge formed in the intersecting ridgeline between a wall surface facing towards the front side in the direction of drill rotation of the cutting discharge groove and a tip flank of the bit; wherein, there is only one cutting discharge groove, the leading edge that protrudes farthest towards the tip in the axial direction in the tip flank is composed at a single point, and the distance between this leading edge and the axis is (5/100)D or less with respect to the maximum outer diameter D of the bit, and when the bit is viewed from the tip side in the axial direction, the tip flank is in the form of a multilevel surface composed of a plurality of flanks arranged along the peripheral direction, and a reverse side first flank formed so as to be surrounded by the plurality of flanks arranged along the peripheral direction and intersect with the leading edge.

2. A drill according to claim 1 wherein, an auxiliary groove section is formed, which together with being continuous on the front side in the direction of drill rotation with the cutting discharge groove and extending from the tip to the rear end of the bit, is also cut upward to the cutting discharge groove starting at an intermediate point.

3. A drill according to claim 1 wherein, chisel edges located on roughly mutually opposite sides juxtaposed about the axis are formed in the tip flank, and this pair of chisel edges is made to recede at roughly mutually the same change in inclination towards the rear end in the axial direction moving towards the outside in the radial direction.

4. A drill according to claim 1 wherein, the maximum outer diameter D of the bit is 1 mm or less, and the ratio L/D of the effective length L of the bit to the maximum outer diameter D of the bit is 5 or more.

5. A drill according to claim 1 wherein, when the bit is viewed from the tip side in the axial direction, the distance between the point farthest from the axis on the reverse side first flank and the axis is preferably (1/3)D or less with respect to the maximum outer diameter D of the bit.

6. A drill according to claim 5 wherein, an auxiliary groove section is formed, which together with being continuous on the front side in the direction of drill rotation with the cutting discharge groove and extending from the tip to the rear end of the bit, is also cut upward to the cutting discharge groove starting at an intermediate point.

7. A drill according to claim 5 wherein, chisel edges located on roughly mutually opposite sides juxtaposed about the axis are formed in the tip flank, and this pair of chisel edges is made to recede at roughly mutually the same change in inclination towards the rear end in the axial direction moving towards the outside in the radial direction.

8. A drill according to claim 5 wherein, the maximum outer diameter D of the bit is 1 mm or less, and the ratio L/D of the effective length L of the bit to the maximum outer diameter D of the bit is 5 or more.

9. A drill comprising: a cutting discharge groove extending from the tip towards the rear end of a bit formed in the outer periphery of the bit serving as the tip of a drill body that rotates around an axis, and a cutting edge formed in the intersecting ridgeline between a wall surface facing towards the front side in the direction of drill rotation of the cutting discharge groove and a tip flank of the bit; wherein, there is only one cutting discharge groove, and when the bit is viewed from the tip in the axial direction, the tip flank section located in the region on the opposite side of the cutting edge is in the form of a multilevel surface composed of a plurality of flanks arranged along the peripheral direction juxtaposed about a Y axis perpendicular on the axis to an X axis parallel to the cutting edge through the axis, and at least one of the intersecting ridgelines of the plurality of flanks that compose the tip flank section contact a drilled material during drilling of the drilled material.

10. A drill according to claim 9 wherein, the difference between the distance in the axial direction between the outer peripheral edge of the intersecting ridgeline that contacts the drilled material and the leading edge of the tip flank, and the distance in the axial direction between the outer peripheral edge of the cutting edge and the leading edge of the tip flank is set to be larger than the feeding amount per rotation imparted to the drill body during drilling of the drilled material.

11. A drill according to claim 9 wherein, an auxiliary groove section is formed, which together with being continuous on the front side in the direction of drill rotation with the cutting discharge groove and extending from the tip to the rear end of the bit, is also cut upward to the cutting discharge groove starting at an intermediate point.

12. A drill according to claim 9 wherein, chisel edges located on roughly mutually opposite sides juxtaposed about the axis are formed in the tip flank, and this pair of chisel edges is made to recede at roughly mutually the same change in inclination towards the rear end in the axial direction moving towards the outside in the radial direction.

13. A drill according to claim 9 wherein, the maximum outer diameter D of the bit is 1 mm or less, and the ratio L/D of the effective length L of the bit to the maximum outer diameter D of the bit is 5 or more.

14. A drill, comprising a cutting discharge groove extending from the tip to the rear end of a bit formed in the outer periphery of the bit serving as the tip of a drill body that is rotated around an axis, and a cutting edge formed in the intersecting ridgeline between a wall surface facing towards the front side in the direction of drill rotation of the cutting discharge groove and tip flank of the bit; wherein there is only one cutting discharge groove, the leading edge that protrudes farthest towards the tip in the axial direction in the tip flank is composed at a single point, and the distance between this leading edge and the axis is (5/100)D or less with respect to the maximum outer diameter D of the bit, and an auxiliary groove section is formed, which together with being continuous on the front side in the direction of drill rotation with the cutting discharge groove and extending from the tip to the rear end of the bit, is also cut upward to the cutting discharge groove starting at an intermediate point.

15. A drill, comprising a cutting discharge groove extending from the tip to the rear end of a bit formed in the outer periphery of the bit serving as the tip of a drill body that is rotated around an axis, and a cutting edge formed in the intersecting ridgeline between a wall surface facing towards the front side in the direction of drill rotation of the cutting discharge groove and a tip flank of the bit; wherein there is only one cutting discharge groove, the leading edge that protrudes farthest towards the tip in the axial direction in the tip flank is composed at a single point, and the distance between this leading edge and the axis is (5/100)D or less with respect to the maximum outer diameter D of the bit, and chisel edges located on roughly mutually opposite sides juxtaposed about the axis are formed in the tip flank, and this pair of chisel edges is made to recede at roughly mutually the same change in inclination towards the rear end in the axial direction moving towards the outside in the radial direction.

\* \* \* \* \*